United States Patent
Yoon et al.

(10) Patent No.: US 8,667,585 B2
(45) Date of Patent: Mar. 4, 2014

(54) TRANSMISSION CONTROL PROTOCOL FLOODING ATTACK PREVENTION METHOD AND APPARATUS

(75) Inventors: Seung-Yong Yoon, Daejeon (KR); Byoung-Koo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 43 days.

(21) Appl. No.: 13/287,646

(22) Filed: Nov. 2, 2011

(65) Prior Publication Data

US 2012/0117646 A1 May 10, 2012

(30) Foreign Application Priority Data

Nov. 4, 2010 (KR) .................. 10-2010-0109324

(51) Int. Cl.
*H04L 29/06* (2006.01)
(52) U.S. Cl.
USPC ............. 726/22; 713/151; 726/23; 726/26; 726/27
(58) Field of Classification Search
USPC .......................................... 726/22
See application file for complete search history.

(56) References Cited

U.S. PATENT DOCUMENTS

| | | | |
|---|---|---|---|
| 6,219,706 B1* | 4/2001 | Fan et al. ................ | 709/225 |
| 7,380,272 B2* | 5/2008 | Sharp et al. ............. | 726/11 |
| 8,015,414 B2* | 9/2011 | Mahone et al. .......... | 713/189 |
| 8,341,724 B1* | 12/2012 | Burns et al. ............. | 726/13 |
| 8,347,385 B2* | 1/2013 | Wei et al. ................ | 726/23 |
| 2001/0042200 A1* | 11/2001 | Lamberton et al. ..... | 713/151 |
| 2005/0213504 A1* | 9/2005 | Enomoto et al. ........ | 370/235 |

FOREIGN PATENT DOCUMENTS

KR 10-2008-0021492 A 3/2008

OTHER PUBLICATIONS

Wang et al., Detecting SYN Flooding Attacks, IEEE, 2002.*
Chen, W., & Yeung, D.-Y. (2006). Defending Against TCP SYN Flooding Attacks Under Different Types of IP Spoofing. IEEE, 1-6.*
Schuba, Christoph L., et al., "Analysis of a Denial of Service Attack on TCP", IEEE, 1997, pp. 208-223.

* cited by examiner

*Primary Examiner* — Mohammad L Rahman (57) ABSTRACT

Disclosed herein is a Transmission Control Protocol (TCP) flooding attack prevention method. The TCP flooding attack prevention method includes identifying the type of a packet received at an intermediate stage between a client and a server; determining the direction of the packet; defining a plurality of session states based on the type and the direction of the packet; detecting a TCP flooding attack by tracking the session states for each flow; and responding to the TCP flooding attack based on the type of the TCP flooding attack.

16 Claims, 9 Drawing Sheets

TRANSMISSION CONTROL PROTOCOL FLOODING ATTACK PREVENTION METHOD AND APPARATUS

CROSS REFERENCE TO RELATED APPLICATION

This application claims the benefit of Korean Patent Application No. 10-2010-0109324, filed on Nov. 4, 2010, which is hereby incorporated by reference in its entirety into this application.

BACKGROUND OF THE INVENTION

1. Technical Field

The present invention relates generally to a Transmission Control Protocol (TCP) flooding attack prevention method and apparatus, and, more particularly, to a TCP flooding attack prevention method and apparatus which defines a plurality of session states based on the kind and direction of a packet, tracks the session states for each flow, and detects and responds to a flooding attack, thereby rapidly and accurately detecting and preventing TCP flooding attacks.

2. Description of the Related Art

A Distributed Denial-of-Service (DDoS) attack is performed such that an unspecified number of attackers transmit a large amount of data for the purpose of disturbing the normal service of a system, so that the performance of a target network or system is rapidly deteriorated, thereby disabling the service provided from the corresponding system from being used.

A DDoS attack is divided into a network level attack and an application level attack. The network level attack designates a network level/layer attack such as TCP flooding, User Datagram Protocol (UDP) flooding, and Internet Control Message Protocol (ICMP) flooding. The application level attack designates an application layer attack such as Hypertext Transfer Protocol (HTTP) flooding, Session Initiation Protocol (SIP) flooding, and Domain Name Server (DNS) flooding. Since the attack properties of the two types of attacks are different from each other, the detection and response methods thereof are different from each other.

Most of existing DDoS prevention techniques use a simple method of measuring the amount of traffic, such as Bit per Second (BPS) or Packet per Second (PPS), and blocking packets for a predetermined time if the amount of traffic is greater than a predetermined threshold. Further, Intrusion Detection System/Intrusion Prevention System (IDS/IPS) products use a method of applying string patterns, which mainly appear in a DDoS attack tool, to detection rules, performing a pattern matching function, and instantly blocking a corresponding packet when the packet is detected. However, since there are limits on simple pattern matching, attempts at effective response have been recently made by providing priority queues combined with Quality of Service (QoS) or applying a rate limiting technique.

However, such existing DDoS prevention techniques perform detection and response based on the basically simple amount of traffic and string patterns, so that there are limits on realizing rapid and accurate prevention in an actual DDoS attack situation.

SUMMARY OF THE INVENTION

An object of the present invention is to provide a TCP flooding attack prevention method and apparatus which defines a plurality of session states based on the kind and direction of a packet, tracks the session states for each flow, and detects and responds to a flooding attack, thereby rapidly and accurately detecting and preventing a TCP flooding attack.

A Transmission Control Protocol (TCP) flooding attack prevention method according to an embodiment of the present invention includes: identifying the type of a packet received at an intermediate stage between a client and a server; determining the direction of the packet; defining a plurality of session states based on the type and the direction of the packet; detecting a TCP flooding attack by tracking the session states for each flow; and responding to the TCP flooding attack based on the type of the TCP flooding attack.

Here, the determining the direction of the packet includes comparing the size of a source Internet Protocol (IP) address with the size of a destination IP address, thereby determining the direction of the packet.

A TCP flooding attack prevention apparatus according to another embodiment of the present invention includes: a session state definition unit for defining a plurality of session states based on the type and the direction of a packet received at an intermediate stage between a client and a server; an attack detection unit for detecting a TCP flooding attack by tracking each session state for each flow, and then identifying the type of the TCP flooding attack; and an attack response unit for responding to the TCP flooding attack based on the type of the TCP flooding attack.

Here, the session state definition unit determines the direction of the packet in such a way as to compare the size of a source IP address with the size of a destination IP address, and defines the session states differently based on the direction of the packet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail with reference to the accompanying drawings below. Here, when repeated description and detailed descriptions of well-known functions or configurations may unnecessarily obscure the gist of the present invention, the detailed descriptions will be omitted. The embodiments of the present invention are provided to further completely explain to those skilled in the art the present invention. Therefore, the shapes and sizes of components in the drawings may be exaggerated for the sake of a more exact description.

Figure 1:
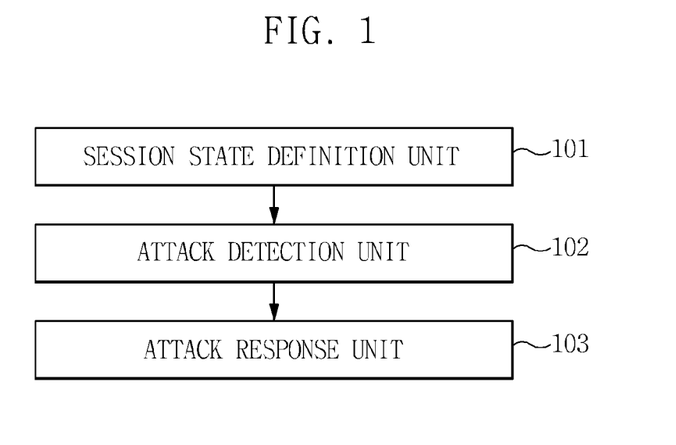
FIG. 1 is a view schematically illustrating a TCP flooding attack prevention apparatus according to an embodiment of the present invention.

FIG. 1 is a view schematically illustrating a TCP flooding attack prevention apparatus according to an embodiment of the present invention.

Referring to FIG. 1, the TCP flooding attack prevention apparatus according to the embodiment of the present invention may include a session state definition unit 101, an attack detection unit 102, and an attack response unit 103. The TCP flooding attack prevention apparatus shown in FIG. 1 is illustrated as an example, and may be configured such that some of the components thereof are added, deleted, or modified as necessary.

The session state definition unit 101 defines a plurality of session states based on the types and directions of respective packets which are received at an intermediate stage between a client and a server. In a session connection and termination process, packets are exchanged at respective steps. Here, the session states may be variously defined based on the types and directions of the respective packets. The session state definition unit 101 defines session states based on the types and directions of the packets so that the TCP flooding attack prevention apparatus according to the embodiment of the present invention can detect various types of TCP flooding attacks and respond thereto. Here, the direction of each of the packets may be determined in such a way as to compare the size of a source Internet Protocol (IP) address with the size of a destination IP address. The session state definition unit 101 may differently define the session states based on the direction of a corresponding packet. As described above, the session states may be defined using various methods, and an example of the method of defining the session states will be described in detail with reference to the drawings.

The attack detection unit 102 tracks session states for each flow, detects a TCP flooding attack, and identifies the type of the TCP flooding attack. In order to detect a TCP flooding attack, basically, session states for each flow should be tracked by the attack detection unit 102. The flow may be defined as a set of packet streams having common properties. In the present invention, flow is defined as a set of packet streams, having the same <destination IP>, the same <destination IP, destination port>, or the same <source IP, destination IP, destination port>. If specific session state is tracked for each flow defined as described above, TCP flooding can be detected and identified for each type thereof. A process of detecting a TCP flooding attack for each type thereof using the attack detection unit 102 will be described in detail with reference to the drawings below.

The attack response unit 103 responds to the TCP flooding attack, detected using the attack detection unit 102, based on the type of the TCP flooding attack, and prevents the TCP flooding attack. That is, when the attack detection unit 102 tracks session states and then detects a TCP flooding for each type thereof, the attack response unit 103 appropriately responds to the TCP flooding for each type thereof. A process of responding to a TCP flooding attack for each type thereof using the attack response unit 103 will be described in detail with reference to the drawings below.

Figure 2:
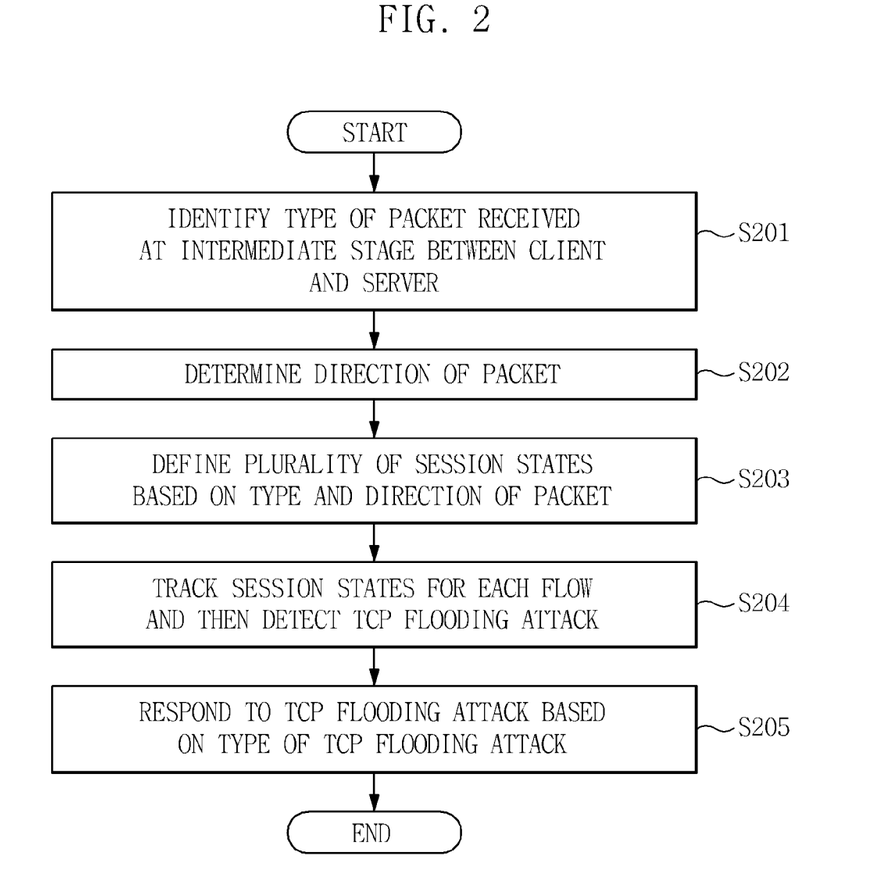
FIG. 2 is a flowchart illustrating a TCP flooding attack prevention method according to an embodiment of the present invention.

FIG. 2 is a flowchart illustrating a TCP flooding attack prevention method according to an embodiment of the present invention.

Referring to FIG. 2, when the TCP flooding attack prevention method according to the embodiment of the present invention starts, the type of a packet received at the intermediate stage between a client and a server is identified at step S201. Next, the direction of the packet is determined at step S202. At step S202, the direction of the packet may be determined in such a way as to compare the size of a source IP address with the size of a destination IP address. When the type and direction of the packet is determined as described above at steps S201 and 202, a plurality of session states are defined based on the type and direction of the packet at step S203. Thereafter, each session state is tracked for each flow, a TCP flooding attack is detected at step S204, and the TCP flooding attack is responded to based on the type of the TCP flooding attack at step S205.

Since the TCP flooding attack prevention method according to the embodiment of the present invention enables a process of preventing a TCP flooding attack to be performed similarly the TCP flooding attack prevention apparatus according to the embodiment of the present invention shown in FIG. 1, the description of FIG. 1 is applied without change unless there is a specific reference thereto and the detailed description of the process of preventing a TCP flooding attack will be omitted. As in FIG. 1, all the steps in the flowchart of FIG. 2 are not essential steps and some of the steps may be added, modified, or deleted according to another embodiment.

Figure 3:
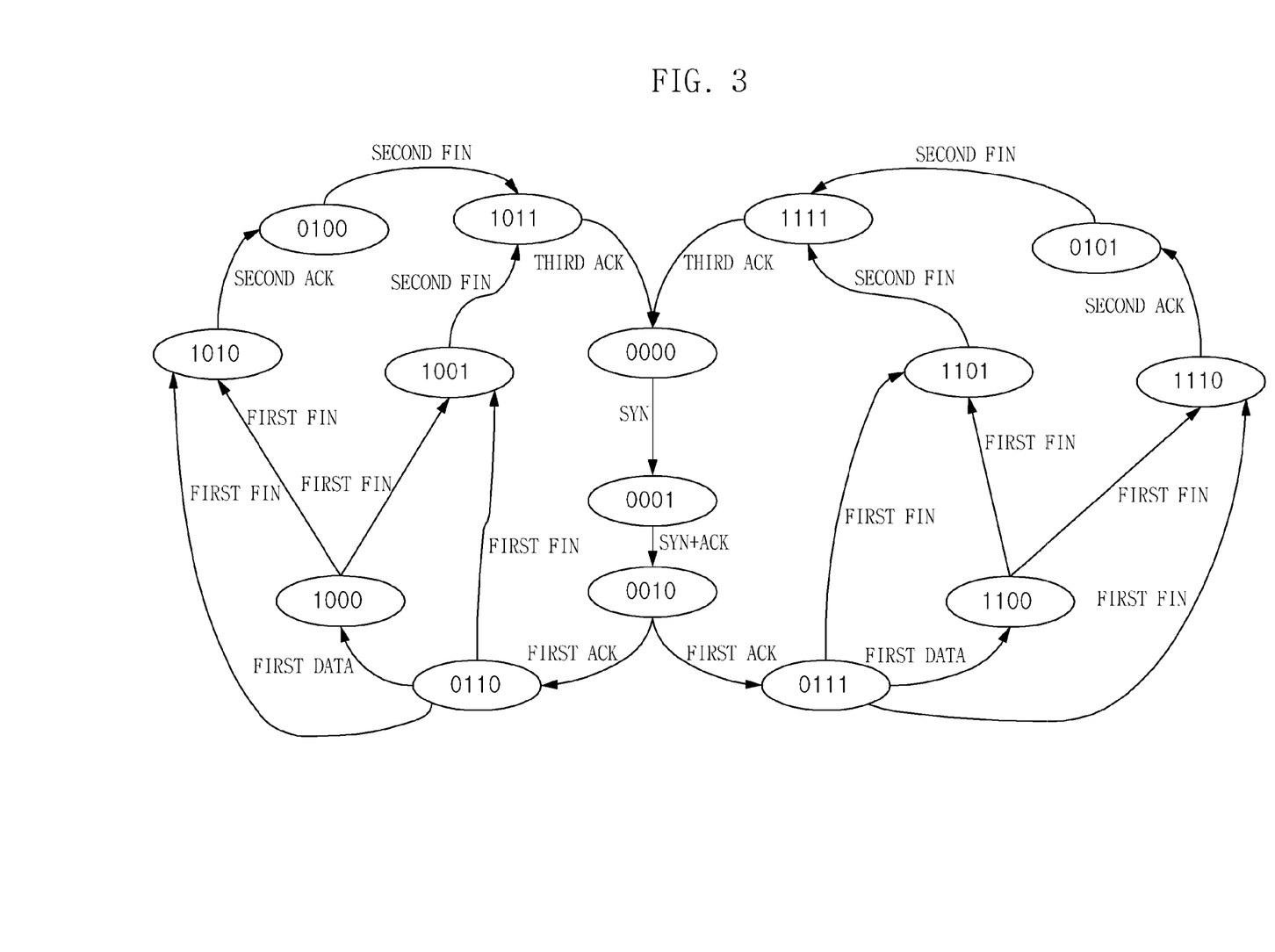
FIG. 3 is a view illustrating an example of session state definition performed using the TCP flooding attack prevention method and apparatus according to an embodiment of the present invention.

FIG. 3 is a view illustrating an example of session state definition performed using the TCP flooding attack prevention method and apparatus according to the embodiment of the present invention.

An example in which session state is defined using the TCP flooding attack prevention method and apparatus according to the present invention will be described as the premise used to describe the TCP flooding attack prevention method and apparatus according to the present invention.

The conventional state transition for the connection and termination of a TCP session between a client and a server may include three steps, that is, a session connection step using 3-way handshaking, a data request and transmission step, and a session termination step using 4-way handshaking. Here, state transition which is appropriate for the client and the server is realized in such a way as to exchange a connection request (SYN) packet, an acknowledgement (ACK) packet, and a termination (FIN) packet.

The TCP flooding attack prevention method and apparatus according to the present invention newly defines session states based on the type of a packet received for each step at the intermediate stage between a client and a server in order to detect a TCP flooding attack by tracking the session state, and tracks the session states for each flow, thereby precisely detecting the attack.

The TCP flooding attack prevention method and apparatus according to the present invention may newly define 16 session states as in Table 1 as an example in order to detect a TCP flooding attack. That is, a new session state, which is different from session states defined based on the conventional TCP state transition, is defined in order to detect a DDoS attack at the intermediate stage between a client and a server.

TABLE 1

| Session state | Description |
|---|---|
| 0000 | unconnected state |
| 0001 | SYN packet is received (SYN_RCVD) (3-way handshaking) |
| 0010 | SYN + ACK packet is received (SYNACK_RCVD) (3-way handshaking) |
| 0011 | Non-use (reserved) |
| 0100 | connected state, size of source IP is smaller than size of destination IP, second ACK packet is received (FIRST_FIN-ACK_RCVD) (client -> server) |

TABLE 1-continued

| Session state | Description |
| --- | --- |
| 0101 | connected state, size of source IP is not smaller than size of destination IP, second ACK packet is received (FIRST_FIN-ACK_RCVD) (client -> server) |
| 0110 | connected state, size of source IP is smaller than size of destination IP, session connection is established |
| 0111 | connected state, size of source IP is not smaller than destination IP, session connection is established |
| 1000 | connected state, size of source IP is smaller than size of destination IP, first data is received (FIRST_DATA_RCVD) (client -> server) |
| 1001 | connected state, size of source IP is smaller than size of destination IP, first FIN packet is received (FIRST_FIN_RCVD) (client -> server) |
| 1010 | connected state, size of source IP is smaller than size of destination IP, first FIN packet is received (FIRST_FIN_RCVD) (server -> client) |
| 1011 | connected state, size of source IP is smaller than size of destination IP, second FIN packet is received (SECOND_FIN_RCVD) (server -> client or client -> server) |
| 1100 | connected state, size of source IP is not smaller than size of destination IP, first data is received (FIRST_DATA_RCVD) (client -> server) |
| 1101 | connected state, size of source IP is not smaller than size of destination IP, first FIN packet is received (FIRST_FIN_RCVD) (client -> server) |
| 1110 | connected state, size of source IP is not smaller than size of destination IP, first FIN packet is received (FIRST_FIN_RCVD) (server -> client) |
| 1111 | connected state, size of source IP is not smaller than size of destination IP, second FIN packet is received (SECOND_FIN_RCVD) (server -> client or client -> server) |

FIG. 3 shows a transition diagram of the session states defined as in Table 1. Each session state of Table 1 will be described with reference to FIG. 3. Referring to FIG. 3, initial session state "0000" indicates the state in which a session connection is not realized. When a client transmits a connection request (SYN) packet to a server for the purpose of making a session connection, the session state is changed from "0000" to "0001". When the server transmits a connection request acknowledgement (SYN+ACK) packet to the client in response to the SYN packet, the session state is changed from "0001" to "0010". When the client transmits a first acknowledgement (ACK) packet, which is the last packet of a 3-way handshaking process in response to the SYN+ACK packet, the size of a source IP address is compared with the size of a destination IP address. When the size of the source IP address is smaller than the size of the destination IP address, the state is changed from "0010" to "0110". If the size of the source IP address is equal to or larger than the size of the source IP address, the state is changed from "0010" to "0111".

The last ACK packet of the TCP 3-way handshaking process is always transmitted from the client to the server. Therefore, if the session state is differently set based on the size of two IP addresses, the direction of a packet obtained after the session connection is created can be easily known, that is, whether the packet is headed for the server from the client or the packet is headed for the client from the server, can be easily ascertained. For example, when session state is "0110", "1000", "1001", "1010", "0100", or "1011", if a packet has a source IP address, in which the size thereof is smaller than that of a destination IP address, the packet is headed for the server from the client. Otherwise, if the packet has a source IP address in which the size thereof is equal to or lager than that of a destination IP address, the packet is headed for the client from the server. Further, when session state is "0111", "1100", "1101", "1110", "0101", or "1111", if a packet has a source IP address in which the size thereof is smaller than that of a destination IP address, the packet is headed for the client from the server. Otherwise, if the packet has a source IP address in which the size is equal or larger than that of a destination IP address, the packet is headed for the server from the client. Since session state transition is performed based on current session state and the direction of a packet, it is necessary to determine the direction of a packet.

After the TCP 3-way handshaking process is completed and session connection is established, if first data transmission is performed from the client to the server, the session state "0110" is changed to "1000" state and the session state "0111" is changed to "1100" state. If a first FIN packet used to terminate the session is transmitted from the client to the server without data transmission, the session state "0110" is changed to "1001" state and the session state "0111" is changed to "1101" state. If a second FIN packet used to terminate the session is transmitted from the server to the client in the changed state, the session state "1001" is changed to "1011" state and the session state "1101" is changed to "1111" state. Otherwise, if the first FIN packet used to terminate the session is transmitted from the server to the client without data transmission, the session state "0110" is changed to "1010" state and the session state "0111" is changed to "1110" state. If a second ACK packet relevant to the first FIN packet is transmitted from the client to the server in the changed state, the session state "1010" is changed to "0100" state and the session state "1110" is changed to "0101" state. Next, if a second FIN packet used to terminate the session is transmitted from the server to the client, the session state "1001" is changed to "1011" state and the session state "1101" is changed to "1111" state.

In the state in which data transmission is performed while the first FIN packet used to terminate the session is not transmitted, the session states "1000" and "1100" are maintained. If the data transmission is completed and the first FIN packet used to terminate the session in the normal 4-way handshaking process is transmitted, the state transition is performed differently based on the direction of the packet. If the first FIN packet is transmitted from the client to the server, the session state "1000" is changed to "1001" state and the session state "1100" is changed to "1101" state. If the first FIN packet is transmitted from the server to the client, the session state "1000" is changed to "1010" state and the session state "1100" is changed to "1110" state. If the first FIN packet in the 4-way handshaking process is transmitted from the server to the client and the second ACK packet is transmitted from the client to the server in response to the first FIN packet, the session state "1010" is changed to "0100" state and the session state "1110" is changed to "0101" state.

If the second FIN packet used for the 4-way handshaking process is transmitted, the state transition is also performed differently based on the direction of the packet. If the second FIN packet is transmitted from the client to the server, the session state "0100" is changed to "1011" state and the session state "0101" is changed to "1111" state. If the second FIN packet is transmitted from the server to the client, the session state "1001" is changed to "1011" state and the session state "1101" is changed to "1111" state.

If a third ACK packet is transmitted in response to the second FIN packet in the 4-way handshaking process, the session state "1011" is changed to "0000" state and the session state "1111" is changed to "0000" state. That is, the session termination process is completed and the session state is changed to the initial state "0000".

Until now, the conditions, in which transition is performed to each of corresponding sessions, have been described in consideration of session state, newly defined at the intermediate stage of a client and a server, and in consideration of the direction of a packet in order to detect a TCP flooding attack by tracking the session state. From now, a method of detecting and preventing a TCP flooding attack by tracking newly defined session states will be described.

DDoS traffic attacks at the network level may be divided into TCP flooding, UDP flooding, and ICMP flooding based on the type of a protocol. Among these, a TCP flooding attack may be divided into various types such as SYN flooding, ACK flooding, and FIN flooding. The TCP flooding attack prevention method and apparatus according to the embodiment of the present invention may provide a technique of detecting and responding to 6 types of TCP flooding attacks such as SYN flooding, flag flooding, open flooding, connection flooding, FIN-WAIT-1 flooding, and FIN-WAIT-2 flooding.

A process of detecting and responding to a TCP flooding attack for each type thereof using the TCP flooding attack prevention method and apparatus according to the embodiment of the present invention will be described with reference to the drawings below.

Figure 4:
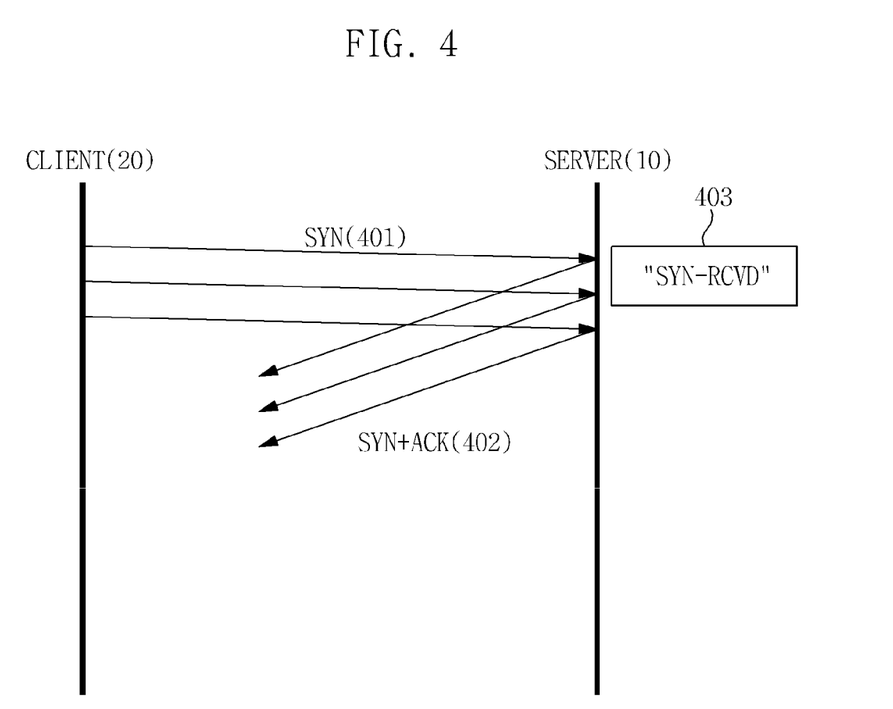
FIG. 4 is a view illustrating a SYN flooding attack.

FIG. 4 is a view illustrating a SYN flooding attack.

The SYN flooding attack is the most representative DDoS attack in which a large amount of SYN packets 401 is transmitted for the purpose of new session connection request. Referring to FIG. 4, in the SYN flooding attack, a large number of SYN packets 401 are transmitted to a server 10 but no first ACK packet is transmitted in response to SYN+ACK packets 402 transmitted from the server 10. Therefore, the server 10 is full of sessions having SYN packet received state, that is, "SYN-RCVD" state 403. Therefore, the backlog queue of the server 10 is exhausted and no more TCP session connection can be created, so that the server 10 changes to out of service state.

The TCP flooding attack prevention method and apparatus according to the embodiment of the present invention may detect a SYN flooding attack as follows. In the case of the SYN flooding, a first ACK packet, which is the last packet in the 3-way shaking process, is not transmitted, so that session state in which the client 20 receives the SYN+ACK packet 402, that is, the session state "0010", rapidly increases. In the case of a normal session connection, the last ACK packet is instantly transmitted and the session state is changed to "0110" state, so that the number of sessions, in which session state is "0010", is maintained in a predetermined range for a predetermined time. Generally, the number of "0010" state is maintained to be lower than 10. Therefore, according to the TCP flooding attack prevention method and apparatus according to the embodiment of the present invention, if the number of session states "0010" measured for each flow is equal to or larger than a first threshold, it may be detected that SYN flooding has occurred. The first threshold is a value which may be preset by a user in order to prevent the number of session states "0010" from being too excessive and the server 10 from being put into out of service state. The above-described process of detecting a SYN flooding attack may be performed using the attack detection unit of the TCP flooding attack prevention apparatus according to the embodiment of the present invention, and may be performed in the detecting step of the TCP flooding attack prevention method according to the embodiment of the present invention.

The TCP flooding attack prevention method and apparatus according to the embodiment of the present invention may respond to the SYN flooding attack as follows. The SYN flooding attack may be responded to in such a way that rate-limit is applied to traffic heading for <a destination IP> or <a destination IP and a destination port>, in which the SYN flooding is detected, or in such a way that the access history is tracked and only reliable source IPs are allowed to pass. Further, the conventional response method, such as SYN cookie proxy, may be used. The above-described process of responding to a SYN flooding attack may be performed using the attack response unit of the TCP flooding attack prevention apparatus according to the embodiment of the present invention, and may be performed in the responding step of the TCP flooding attack prevention method according to the embodiment of the present invention.

Figure 5:
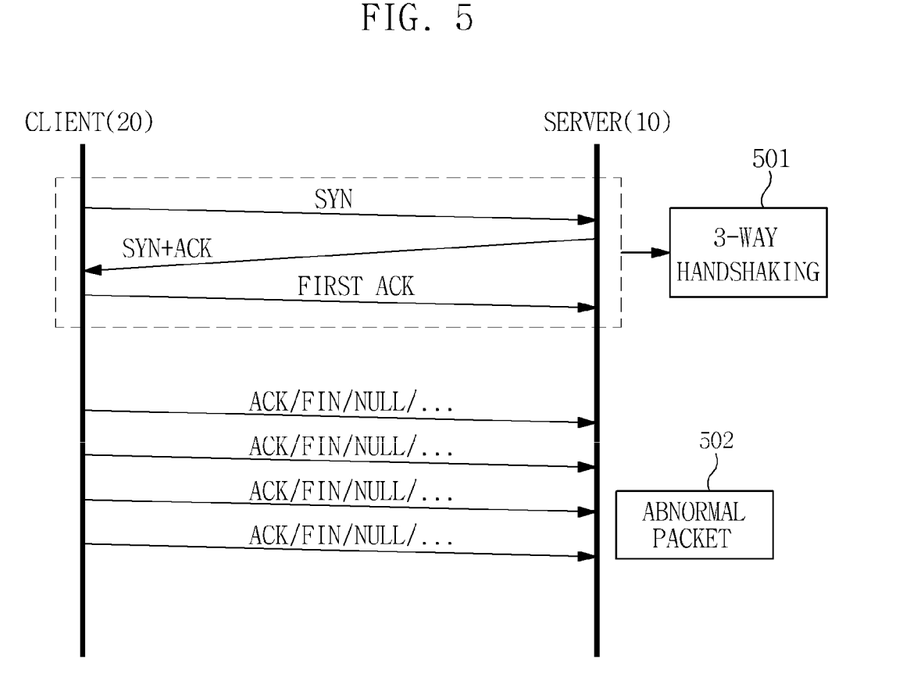
FIG. 5 is a view illustrating a flag flooding attack.

FIG. 5 is a view illustrating the flag flooding attack.

Referring to FIG. 5, in the flag flooding attack, a large amount of packets in which a session connection is not established, that is, out-of-state packets, is transmitted. That is, while a TCP 3-way handshaking process 501 used to create normal session connection is not performed, arbitrary TCP flags are generated and a large amount of abnormal packets 502 are transmitted to the server 10. For example, a large amount of packets, such as SYN+ACK, ACK, FIN, RST, PSH+ACK, NULL, and XMAS, or a large amount of random flag packets are transmitted, thereby causing a denial-of-service attack.

The TCP flooding attack prevention method and apparatus according to the embodiment of the present invention may detect the flag flooding attack as follows. In the flag flooding, when a packet other than a SYN packet, for example, an ACK packet, a FIN packet, or a PSH+ACK packet, is received and session state detection reveals that the packet does not correspond to relevant session state, the corresponding packet is regarded as an abnormal packet 502 since the packet is an out-of-state packet. If the number of such abnormal packets 502, measured for each flow, is equal to or larger than a second threshold, it is determined to be the flag flooding. The second threshold is a value which may be preset by a user in order to prevent the number of the abnormal packets 502 from being too excessive and the server 10 from being put into out of service state. The above-described process of detecting the flag flooding attack may be performed using the attack detection unit of the TCP flooding attack prevention apparatus according to the embodiment of the present invention, and may be performed in the detecting step of the TCP flooding attack prevention method according to the embodiment of the present invention.

The TCP flooding attack prevention method and apparatus according to the embodiment of the present invention may respond to the flag flooding attack as follows. When the flag flooding is detected, the TCP flooding attack prevention method and apparatus may respond to a corresponding packet in a packet-by-packet manner. That is, the TCP flooding attack prevention method and apparatus according to the embodiment of the present invention may drop all the abnormal packets 502. The above-described process of responding to the flag flooding attack may be performed using the attack response unit of the TCP flooding attack prevention apparatus according to the embodiment of the present invention, and may be performed in the responding step of the TCP flooding attack prevention method according to the embodiment of the present invention.

Figure 6:
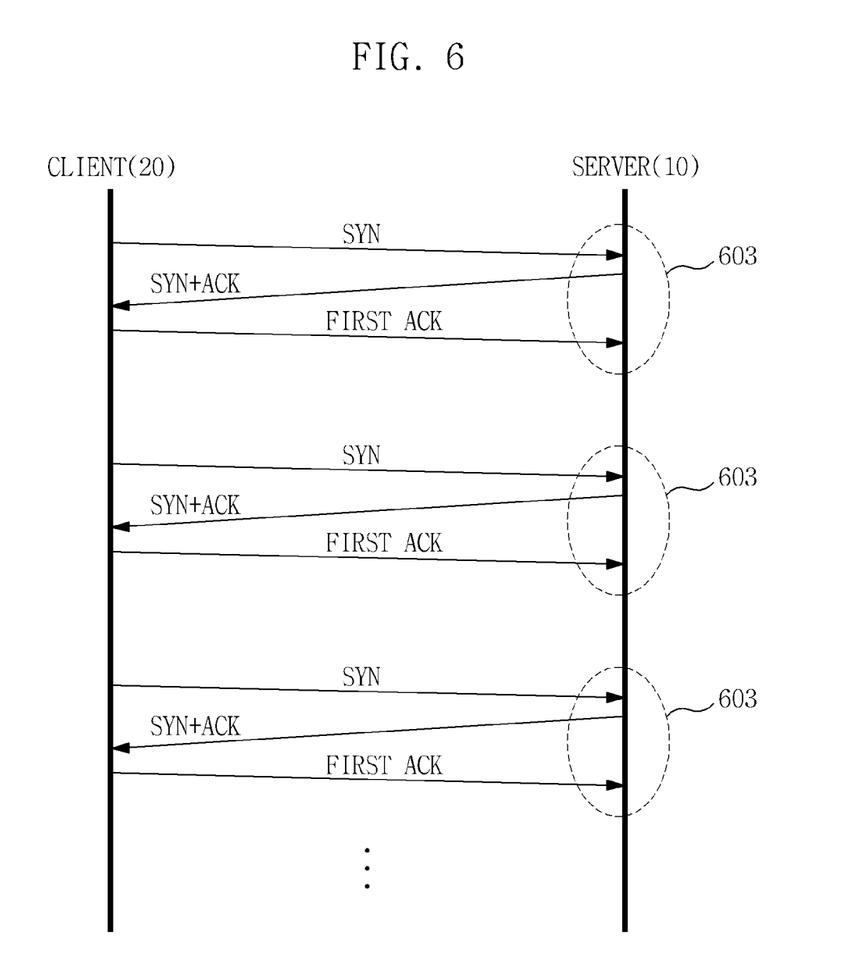
FIG. 6 is a view illustrating an open flooding attack.

FIG. 6 is a view illustrating an open flooding attack.

Referring to FIG. 6, an open flooding attack is performed in such a way that, after a session connection is created, a session connection 603 is continuously made while data packet is not transmitted, thereby exhausting the sessions of the server 10. In a normal case, a process of creating a TCP session connection, transmitting data, and then terminating the session is performed. However, in the case of the open flooding attack, the process of transmitting data and terminating a session is omitted. If the open flooding attack is continued, a session connection 603 is continuously performed without performing the process of terminating the session, so that the number of session connections of the server 10 reaches the maximum limit and the server 10 cannot provide a new session connection any more.

The TCP flooding attack prevention method and apparatus according to the embodiment of the present invention may detect the open flooding attack as follows. In the open flooding attack, after a first ACK packet, which is the last packet of the 3-way handshaking process is received and a session connection 603 is created, data transmission is not performed, thereby rapidly increasing the session state in which the server 10 receives the first ACK packet and the session connection 603 is established, that is, the session state "0110" or "0111". In the case of normal session connection, after session connection is created, data transmission is instantly performed, so that the session state is changed to the "1000" or "1100" state, thereby maintaining the number of sessions in which the session state is "0110" or "0111" within a predetermined range for a predetermined time. Therefore, according to the TCP flooding attack prevention method and apparatus according to the embodiment of the present invention, the open flooding is detected when the number of session states "0110" or "0111" measured for each flow is equal to or larger than a third threshold. The third threshold is a value which may be preset by a user in order to prevent the number of session states of "1000" or "1100" from being too excessive and the server 10 from being put in out of service state. The above-described process of detecting open flooding attack may be performed using the attack detection unit of the TCP flooding attack prevention apparatus according to the embodiment of the present invention, and may be performed in the detecting step of the TCP flooding attack prevention method according to the embodiment of the present invention.

Since the TCP flooding attack prevention method and apparatus according to the embodiment of the present invention may respond to an open flooding attack, a connection flooding attack, a FIN-WATT-1 flooding attack, and a FIN-WATT-2 flooding attack using the same manner, a process of responding thereto will be described later.

Figure 7:
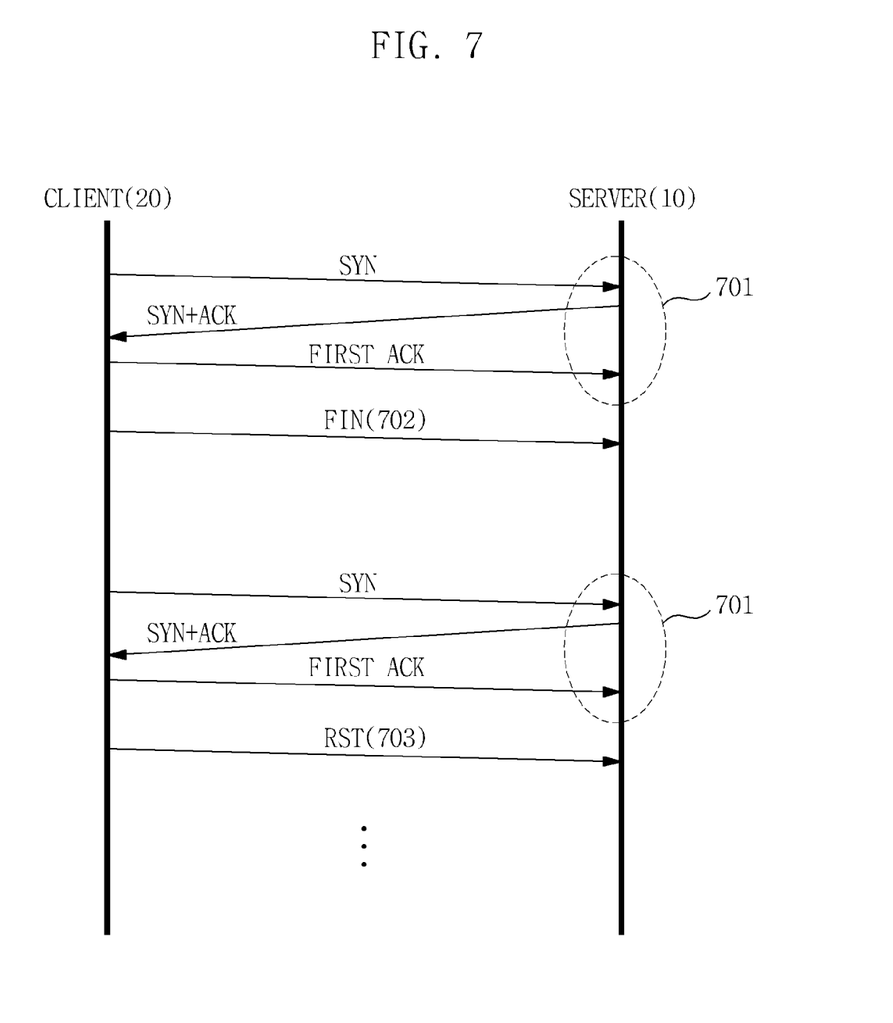
FIG. 7 is a view illustrating a connection flooding attack.

FIG. 7 is a view illustrating connection flooding attack.

Referring to FIG. 7, the connection flooding attack is performed in such a way that, after a TCP session connection 701 is created, a FIN packet 702 or an RST packet 703 is instantly transmitted while data packet is not transmitted, so that the session is terminated, thereby adding to the load of the server 10. In a normal case, after the TCP session connection 701 is created, a process of transmitting data and terminating the session is performed. However, in the case of the connection flooding attack, the session is instantly terminated while the process of transmitting data is not performed. Since this attack increases Connections per Second (CPS) of the server 10, it is also called a CPS flooding attack.

The TCP flooding attack prevention method and apparatus according to the embodiment of the present invention can detect a connection flooding attack as follows. In the connection flooding attack, after the session connection 701 is created, a packet, such as the FIN packet 702 or the RST packet 703, used to instantly terminate the session is transmitted while data is not transmitted. Therefore, the connection flooding attack can be detected by tracking the number of sessions in abnormal state. That is, the connection flooding attack is detected when the number of sessions, in which the FIN packet 702 or the RST packet 703 is received in the session state "0110" or "0111" in which the server 10 receives the first acknowledgement (ACK) packet and the session connection 701 is established, is equal to or larger than a fourth threshold. The fourth threshold is a value which may be preset by a user in order to prevent the number of the sessions in which a packet used to terminate a session is received right after the session connection 701 is created from being excessive and the server 10 from being put into out of service state. The above-described process of detecting the connection flooding attack may be performed using the attack detection unit of the TCP flooding attack prevention apparatus according to the embodiment of the present invention, and may be performed in the detecting step of the TCP flooding attack prevention method according to the embodiment of the present invention.

As described above, since the TCP flooding attack prevention method and apparatus according to the embodiment of the present invention may respond to an open flooding attack, a connection flooding attack, a FIN-WAIT-1 flooding attack, and a FIN-WAIT-2 flooding attack using the same manner, a process of responding thereto will be described later.

Figure 8:
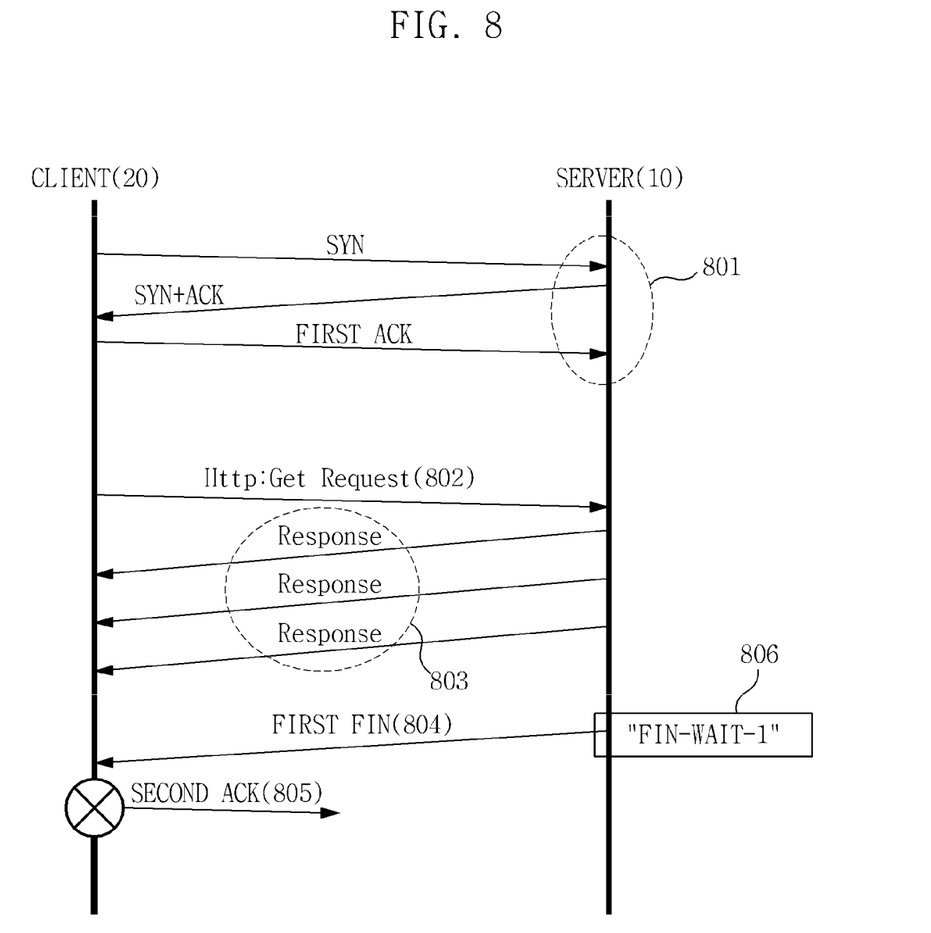
FIG. 8 is a view illustrating a FIN-WAIT-1 flooding attack.

FIG. 8 is a view illustrating a FIN-WAIT-1 flooding attack.

Referring to FIG. 8, the FIN-WAIT-1 flooding attack is performed in such a way that a second ACK packet 805 is not transmitted in response to a first FIN packet 804 received from the server 10 in order to terminate a session, thereby exhausting the resource of the server 10. That is, if the FIN-WAIT-1 flooding attack is received, a necessary process of creating a session connection 801 and completing data transmission using a normal TCP 3-way handshaking process, and then terminating the session using a TCP 4-way handshaking process, is not normally performed. As shown in FIG. 8, when a data request (Http: Get Request) 802 is received from the client 20, the server 10 completes data transmission 803, and then transmits a first FIN packet 804 used to terminate a session to the client 20. If the client 20 does not transmit a second ACK packet 805 after receiving the first FIN packet 804, the server 10 is full of the sessions of "FIN-WAIT-1" state 806. Therefore, resources are exhausted, so that the server cannot provide normal service until the sessions of the "FIN-WAIT-1" state 806 have timed out.

The TCP flooding attack prevention method and apparatus according to the embodiment of the present invention may detect the FIN-WAIT-1 flooding attack as follows. In the FIN-WAIT-1 flooding attack, after the first FIN packet 804 is transmitted from the server 10 to the client 20 in order to terminate a relevant session, the second ACK packet 805 is not transmitted in response to the first FIN packet 804 from the client 20, thereby rapidly increasing session state in which the client 20 received the first FIN packet 804, that is, session state "1010" or "1110". In the case of normal session termination, after the first FIN packet 804 is received, the second ACK packet 805 is instantly transmitted and the session state is changed to "0100" or "0101" state, so that the number of sessions of the session state "1010" or "1110" is maintained within a predetermined range for a predetermined time. Therefore, if the number of session states "1010" or "1110" measured for each flow is equal to or larger than a fifth threshold, the FIN-WAIT-1 flooding attack may be detected. The fifth threshold is a value which may be preset by a user in order to prevent the number of the session state, in which the client 20 received the first FIN packet 804, from being too excessive and the server 10 from being put into out of service state. The above-described process of detecting the FIN-WAIT-1 flooding attack may be performed using the attack detection unit of the TCP flooding attack prevention apparatus according to the embodiment of the present invention, and may be performed in the detecting step of the TCP flooding attack prevention method according to the embodiment of the present invention.

As described above, since the TCP flooding attack prevention method and apparatus according to the embodiment of the present invention may respond to an open flooding attack, a connection flooding attack, a FIN-WAIT-1 flooding attack, and a FIN-WAIT-2 flooding attack using the same manner, a process of responding thereto will be then described later.

Figure 9:
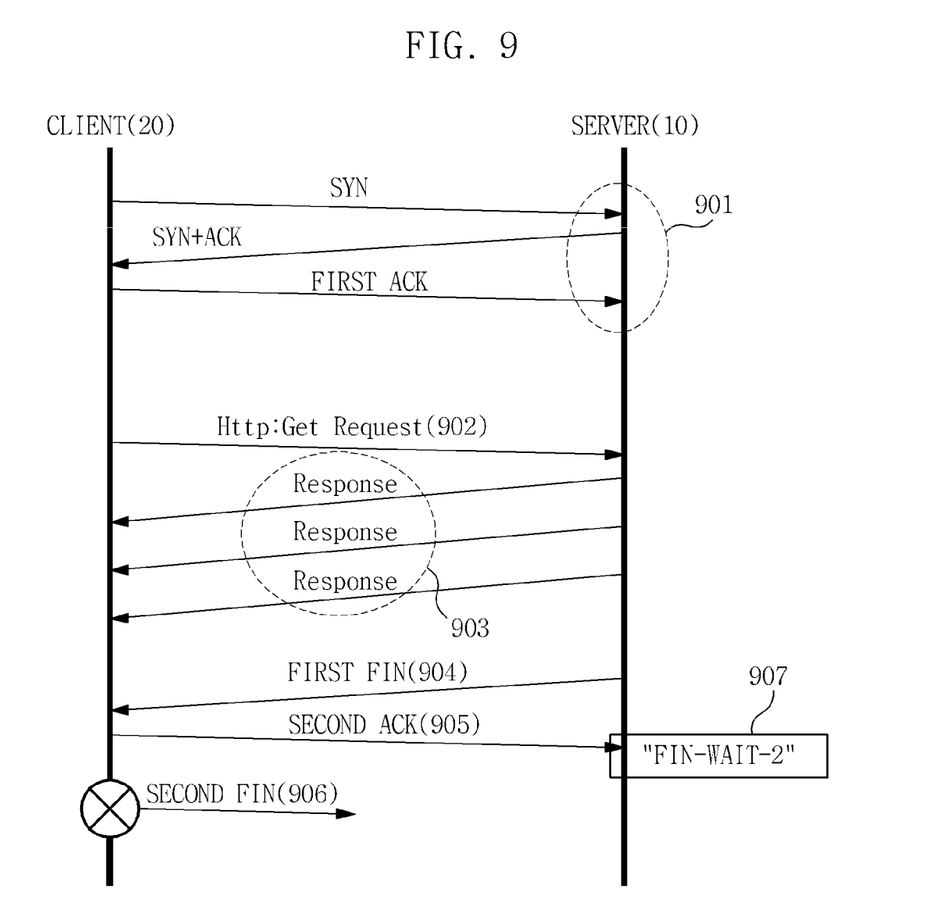
FIG. 9 is a view illustrating a FIN-WAIT-2 flooding attack.

FIG. 9 is a view illustrating a FIN-WAIT-2 flooding attack.

Referring to FIG. 9, the FIN-WAIT-2 flooding attack is performed in such a way that, after a second ACK packet 905 is transmitted in response to a first FIN packet 904 received from the server 10 in order to terminate a session, the client 20 does not transmit a second FIN packet 906, thereby exhausting the resource of the server 10. A necessary process of creating a session connection 901 using a normal TCP 3-way handshaking process, completing data transmission, and then terminating the session using a TCP 4-way handshaking process is not normally performed. As shown in FIG. 9, when a data request (Http: Get Request) 902 is received from the client 20, the server 10 completes data transmission 903, and then transmits the first FIN packet 904 used to terminate a session to the client 20. If the client 20 does not transmit a second FIN packet 906 after receiving the first FIN packet 904 and transmitting a second ACK packet 905, the server 10 is full of sessions of "FIN-WAIT-2" state 907. Therefore, resources are exhausted, so that the server cannot provide normal service until the sessions of "FIN-WAIT-2" state 907 have timed out.

The TCP flooding attack prevention method and apparatus according to the embodiment of the present invention may detect the FIN-WAIT-2 flooding attack as follows. In the FIN-WAIT-2 flooding attack, after the first FIN packet 904 is transmitted from the server 10 to the client 20 in order to terminate a relevant session and the second ACK packet 905 is transmitted in response to the first FIN packet 904 from the client 20, the second ACK packet 905 is not transmitted in response to the second ACK packet 905 from the client 20, thereby rapidly increasing the session state in which the server 10 received the second ACK packet 905 in response to the first FIN packet 904, that is, session state "0100" or "0101". In the case of normal session termination, after the first FIN packet 904 is transmitted from the server 10 to the client 20 and the second ACK packet 905 is transmitted in response to the first FIN packet 904, the second FIN packet 906 is instantly transmitted from the client 20 to the server 10, so that the session state is changed to "1011" or "1111" state and the number of sessions of session state "0100" or "0101" is maintained within a predetermined range for a predetermined time. Therefore, if the number of session states "0100" or "0101" measured for each flow is equal to or larger than a sixth threshold, the FIN-WAIT-2 flooding attack may be detected. The sixth threshold is a value which may be preset by a user in order to prevent the number of the session state, in which the server 10 received the second ACK packet 905 in response to the first FIN packet 904, from being too excessive and the server 10 from being put into out of service state. The above-described process of detecting the FIN-WAIT-2 flooding attack may be performed using the attack detection unit of the TCP flooding attack prevention apparatus according to the embodiment of the present invention, and may be performed in the detecting step of the TCP flooding attack prevention method according to the embodiment of the present invention.

As described above, the TCP flooding attack prevention method and apparatus according to the embodiment of the present invention may respond to an open flooding attack, a connection flooding attack, a FIN-WAIT-1 flooding attack, and a FIN-WAIT-2 flooding attack using the same manner, a process of responding thereto is as follows. In the open flooding attack, the connection flooding attack, the FIN-WAIT-1, and the FIN-WAIT-2 flooding attack, an attack is detected with respect to a session through which a normal 3-way handshaking process is performed, that is, an attack in which a source IP spoofing cannot be realized is detected. Therefore, the attack can be effectively prevented using a method of managing the source IP of a detected packet using a list, such as an Access Control List (ACL) or a blacklist, and blocking all the traffic transmitted from the corresponding source IP for a predetermined time. The predetermined time may be a time for which a DDoS attack has continued or a time determined by a user. The above-described process of responding to an attack may be performed using the attack response unit of the TCP flooding attack prevention apparatus according to the embodiment of the present invention, and may be performed in the responding step of the TCP flooding attack prevention method according to the embodiment of the present invention.

According to an aspect of the present invention, the present invention may provide a TCP flooding attack prevention method and apparatus which define a plurality of session states based on the kind and direction of a packet, tracks the session states for each flow, and detects and responds to a flooding attack, thereby rapidly and accurately detecting and preventing the TCP flooding attacks.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer-implemented Transmission Control Protocol (TCP) flooding attack prevention method, comprising:
    identifying a type of a packet received at an intermediate stage between a client and a server;
    determining a direction of the packet;
    defining a session state that represents a state of a session between the client and the server based on the type and the direction of the packet;
    detecting a TCP flooding attack by tracking session states for a flow including a set of packets received between the client and the server; and
    responding to the TCP flooding attack,
    wherein one or more of the above steps are performed using a computer processor, and
    wherein:
    the detecting comprises detecting an open flooding attack when a number of session states, in which the server receives a first acknowledgement (ACK) packet and a session connection is established, is equal to or larger than a third threshold; and
    the responding comprises managing a source IP of a packet for which the open flooding attack has been detected using a list, and blocking traffic transmitted from the corresponding source IP for a predetermined time.

2. The TCP flooding attack prevention method as set forth in claim 1, wherein the determining the direction of the packet comprises comparing a size of a source Internet Protocol (IP) address with a size of a destination IP address, thereby and determining the direction of the packet.

3. The TCP flooding attack prevention method as set forth in claim 1, wherein:
   the detecting comprises detecting a connection request flooding attack when a number of session states in which the client has received a connection request acknowledgement packet is equal to or larger than a first threshold; and
   the responding comprises controlling a rate of traffic for a flow for which the connection request flooding attack has been detected.

4. The TCP flooding attack prevention method as set forth in claim 1, wherein:
   the detecting comprises detecting a connection request flooding attack when a number of session states in which the client has received a connection request acknowledgement packet is equal to or larger than a first threshold; and
   the responding comprises tracking access history of one or more source IPs and allowing only one or more reliable sources IPs to pass.

5. The TCP flooding attack prevention method as set forth in claim 1, wherein:
   the detecting comprises, when one or more packets other than a connection request packet are received, regarding the received packets as abnormal packets if a session state, which is obtained after the packets are received, does not correspond to a session state defined in the defining, and
   detecting a flag flooding attack when a number of the abnormal packets is equal to or larger than a second threshold; and
   the responding comprises dropping the abnormal packets.

6. The TCP flooding attack prevention method as set forth in claim 1, wherein:
   the detecting comprises detecting a connection flooding attack when a number of sessions, in which a packet used to terminate a session is received in a session state in which the server receives the first acknowledgement (ACK) packet and the session connection is established, is equal to or larger than a fourth threshold; and
   the responding comprises managing a source IP of a packet for which the connection flooding attack has been detected using a list, and blocking traffic transmitted from the corresponding source IP for a predetermined time.

7. The TCP flooding attack prevention method as set forth in claim 1, wherein:
   the detecting comprises detecting a first connection termination (FIN-WAIT-1) flooding attack when a number of session states, in which the client receives a first termination (FIN) packet, is equal to or larger than a fifth threshold; and
   the responding comprises managing a source IP of a packet for which the FIN-WAIT-1 flooding attack has been detected using a list, and blocking traffic transmitted from the corresponding source IP for a predetermined time.

8. The TCP flooding attack prevention method as set forth in claim 1, wherein:
   the detecting comprises detecting a second connection termination (FIN-WAIT-2) flooding attack when a number of session states, in which the server receives a second ACK packet in response to a first FIN packet, is equal to or larger than a sixth threshold; and
   the responding comprises managing a source IP of a packet for which the FIN-WAIT-2 flooding attack has been detected using a list, and blocking traffic transmitted from the corresponding source IP for a predetermined time.

9. A non-transitory computer readable medium having a computer program for causing a computer to prevent a TCP flooding attack, the computer readable medium comprising:
   a session state definition code, being operable to define a session state that represents a state of a session between a client and a server based on a type and a direction of a packet received at an intermediate stage between the client and the server;
   an attack detection code, being operable to detect a TCP flooding attack by tracking session states for a flow including a set of packets received between the client and the server, and then identifying a type of the TCP flooding attack; and
   an attack response code, being operable to respond to the TCP flooding attack based on the type of the TCP flooding attack,
   wherein:
   the attack detection code is operable to detect an open flooding attack when a number of session states, in which the server receives a first ACK packet and a session connection is established, is equal to or larger than a third threshold; and
   the attack response code is operable to manage a source IP of a packet for which the open flooding attack has been detected using a list, and to block traffic transmitted from the corresponding source IP for a predetermined time.

10. The computer readable medium as set forth in claim 9, wherein the session state definition code is operable to determine the direction of the packet in such a way as to compare a size of a source IP address with a size of a destination IP address, and define the session states differently based on the direction of the packet.

11. The computer readable medium as set forth in claim 9, wherein:
    the attack detection code is operable to detect a connection request flooding attack when a number of session states in which the client has received a connection request acknowledgement packet is equal to or larger than a first threshold; and
    the attack response code is operable to control a rate of traffic for which the connection request flooding attack has been detected.

12. The computer readable medium as set forth in claim 9, wherein:
    the attack detection code is operable to detect a connection request flooding attack when a number of session states in which the client has received a connection request acknowledgement packet is equal to or larger than a first threshold; and
    the attack response code is operable to track access history of one or more source IPs and allow only one or more reliable source IPs to pass.

13. The computer readable medium as set forth in claim 9, wherein:
    when one or more packets other than a connection request packet are received, the attack detection code is operable to regard the received packets as abnormal packets if a session state, which is obtained after the packets being received, does not correspond to a session state defined by the session state definition code and to detect a flag flooding attack when a number of the abnormal packets is equal to or larger than a second threshold; and the attack response code is operable to drop the abnormal packets.

14. The computer readable medium as set forth in claim 9, wherein:
   the attack detection code is operable to detect a connection flooding attack when a number of sessions, in which a packet used to terminate a session is received in a session state in which the server receives the first ACK packet and the session connection is established, is equal to or larger than a fourth threshold; and
   the attack response code is operable to manage a source IP of a packet for which the connection flooding attack has been detected using a list, and to block traffic transmitted from the corresponding source IP for a predetermined time.

15. The computer readable medium as set forth in claim 9, wherein
   the attack detection code is operable to detect a first connection termination (FIN-WAIT-1) flooding attack when a number of session states, in which the client receives a first termination (FIN) packet, is equal to or larger than a fifth threshold; and
   the attack response code is operable to manage a source IP of a packet for which the FIN-WAIT-1 flooding attack has been detected using a list, and to block traffic transmitted from the corresponding source IP for a predetermined time.

16. The computer readable medium as set forth in claim 9, wherein:
   the attack detection code is operable to detect a second connection termination (FIN-WAIT-2) flooding attack when a number of session states, in which the server receives a second ACK packet in response to a first FIN packet, is equal to or larger than a sixth threshold; and
   the attack response code is operable to manage a source IP of a packet for which the FIN-WAIT-2 flooding attack has been detected using a list, and to block traffic transmitted from the corresponding source IP for a predetermined time.

\* \* \* \* \*